(12) United States Patent
Huang et al.

(10) Patent No.: US 12,126,415 B2
(45) Date of Patent: Oct. 22, 2024

(54) DATA PROCESSING METHOD, DEVICE, APPARATUS, AND STORAGE MEDIUM

(71) Applicant: GUANGDONG OPPO MOBILE TELECOMMUNICATIONS CORP., LTD., Dongguan (CN)

(72) Inventors: Yingpei Huang, Dongguan (CN); Wenhong Chen, Dongguan (CN); Yun Fang, Dongguan (CN); Zhihua Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 268 days.

(21) Appl. No.: 17/558,939

(22) Filed: Dec. 22, 2021

(65) Prior Publication Data

US 2022/0116091 A1    Apr. 14, 2022

Related U.S. Application Data

(63) Continuation of application No. PCT/CN2019/104594, filed on Sep. 5, 2019.

(30) Foreign Application Priority Data

Jun. 25, 2019 (WO) ................ PCT/CN2019/092841

(51) Int. Cl.
*H04W 56/00* (2009.01)
*H04B 7/06* (2006.01)

(52) U.S. Cl.
CPC .......... *H04B 7/0626* (2013.01); *H04B 7/063* (2013.01); *H04B 7/0634* (2013.01)

(58) Field of Classification Search
CPC ..... H04B 7/0626; H04B 7/063; H04B 7/0634
USPC ........................................ 370/329
See application file for complete search history.

(56) References Cited

U.S. PATENT DOCUMENTS

| 2022/0006502 A1* | 1/2022 | Rahman | ............... H04B 7/0634 |
| 2022/0239360 A1* | 7/2022 | Faxér | ................... H04B 7/0478 |

FOREIGN PATENT DOCUMENTS

| CN | 104144027 A | 11/2014 |
| CN | 105429683 A | 3/2016 |
| CN | 107529691 A | 1/2018 |
| CN | 107682054 A | 2/2018 |
| CN | 107836088 A | 3/2018 |
| CN | 109150412 A | 1/2019 |
| CN | 109302857 A | 2/2019 |

(Continued)

OTHER PUBLICATIONS

"Gao, Method For Indicating Channel State Information And Communication Device, Oct. 9, 2020, CN111757382" (Year: 2019).*

(Continued)

*Primary Examiner* — Sai Ming Chan
(74) *Attorney, Agent, or Firm* — BAYES PLLC

(57) ABSTRACT

A data processing method, a device, an apparatus, and a storage medium. The method includes: obtaining first Channel State Information (CSI); and determining second CSI in the first CSI according to first information. The first information includes at least one of: a non-zero Linear Combination (LC) coefficient, a frequency domain component, a polarization direction, and an order between layers.

10 Claims, 10 Drawing Sheets

(56) References Cited

FOREIGN PATENT DOCUMENTS

| CN | 109510654 A | 3/2019 |
|---|---|---|
| WO | 2019034121 A1 | 2/2019 |

OTHER PUBLICATIONS

First Office Action issued in corresponding Chinese application No. 202210122337.4, mailed Apr. 11, 2023.
First Office Action issued in corresponding European application No. 19935410.1, mailed Apr. 12, 2023.
Notice of Allowance issued in corresponding Chinese application No. 202210122337.4, mailed Jun. 27, 2023.
International Search Report issued in corresponding International Application No. PCT/CN2019/104594, mailed Mar. 27, 2020, 32 pages.
Written Opinion of the International Searching Authority issued in corresponding International Application No. PCT/CN2019/104594, mailed Mar. 27, 2020, 9 pages.
International Search Report issued in corresponding International Application No. PCT/CN2019/092841, mailed Mar. 16, 2020, 29 pages.
Written Opinion of the International Searching Authority issued in corresponding International Application No. PCT/CN2019/092841, mailed Mar. 16, 2020, 8 pages.
"On CSI omission procedure", Agenda Item: 7.2.8.5, Source: Ericsson, 3GPP TSG RAN WG1 Meeting RAN1#97 R1-1907076, Reno, US, May 13-17, 2019, 6 pages.
"Issues on CSI reporting", Agenda item: 7.1.2.2.2, Source: Samsung, 3GPP TSG RAN WG1 Meeting #93 R1-1806714, Busan, Korea, May 21-25, 2018, 8 pages.
"Further discussion on type II CSI compression and feedback for high rank extension", Agenda Item: 7.2.8.1, Source: vivo, 3GPP TSG RAN WG1#96bis R1-1904095, Xi'an, China, Apr. 8-12, 2019, 6 pages.
Extended European Search Report issued in corresponding European application No. 19935410.1, mailed Jul. 7, 2022.
First Office Action issued in corresponding Indian application No. 202227003964, mailed Jul. 21, 2022.
3GPP TS 38.214 V16.0.0 (Dec. 2019); Technical Specification Group Radio Access Network; NR; Physical layer procedures for data (Release 16).
Nokia et al., "MU-CSI Rank extension parameter setting and UCI design", R1-1907315, 3GPP TSG RAN WG1 Meeting #97 Reno, USA, May 13-May 17, 2019.
Notice of Reasons for Refusal issued in corresponding Japanese application No. 2021-577845, mailed Sep. 22, 2023.
Communication Under Rule 71(3) EPC issued in corresponding European Application No. 19935410.1, mailed on Oct. 23, 2023, 58 pages.
"UCI design for DFT-based compression codebook", Agenda Item: 7.2.8.5, Source: Huawei, HiSilicon, 3GPP TSG RAN WG1 Meeting #97, R1-1907526, Reno, USA, May 13-17, 2019, 11 pages.
"CSI Enhancement for MU-MIMO Support", Agenda item: 7.2.8.1, Source: Qualcomm Incorporated, 3GPP TSG RAN WG1 Meeting #97, R1-1907288, May 13-17, 2019, Reno, U.S.A., 15 pages.
Hearing Notice issued in corresponding Indian application No. 202227003964, mailed Jul. 31, 2024.
First Office Action issued in corresponding Korean application No. 10-2021-7042984, mailed Aug. 20, 2024.
Notice of Allowance issued in corresponding Japanese application No. 2021-577845, mailed Aug. 30, 2024.
Source: Ericsson; Title: On CSI enhancements for MU-MIMO 3GPP TSG RAN WG1 Meeting RAN1#97 R1-1907074 Reno, US, May 13-17, 2019.

* cited by examiner

S501

Rank at least one non-zero LC coefficient

S502

Determine a to-be-transmitted non-zero LC coefficient according to the ranked at least one non-zero LC coefficient

DATA PROCESSING METHOD, DEVICE, APPARATUS, AND STORAGE MEDIUM

CROSS-REFERENCE TO RELATED APPLICATION

This application is a continuation of International Application No. PCT/CN2019/104594, filed on Sep. 5, 2019, and claims the priority of Chinese patent application No. PCT/CN2019/092841, filed on Jun. 25, 2019, and titled "DATA PROCESSING METHOD, DEVICE, APPARATUS AND STORAGE MEDIUM", the entire contents of which are incorporated herein by reference.

TECHNICAL FIELD

Embodiments of the present disclosure generally relate to communication technologies, and more particularly, to a data processing method and device, an apparatus and a storage medium.

BACKGROUND

In wireless communications, a terminal device can report Channel State Information (CSI) to a network device (such as a base station, etc.), and the network device performs resource scheduling or other processing based on the CSI reported by the terminal device.

In the actual applications, the terminal device can report the CSI to the network device according to resources allocated by the network device. However, the uplink resources allocated by the network device to the terminal device may be less than the resources required for the terminal device to report the CSI. In this case, the terminal device needs to omit part of the codebook information in the CSI. In the Rel.15 codebook, coding is performed for each subband independently. Therefore, when the network device allocates insufficient uplink resources for the terminal device, the terminal device can preferentially omit the codebook information on the even-numbered subbands. However, since the concept of subband does not exist in Rel.16, the above method is not applicable to the Rel.16 codebook.

SUMMARY

Embodiments of the present disclosure provide a data processing method and device, an apparatus and a storage medium, which are applicable to omission of a part of contents in CSI for the Rel.16 codebook.

According to a first aspect, an embodiment of the present disclosure provides a data processing method, including:
  obtaining first Channel State Information (CSI); and
  determining second CSI in the first CSI according to first information, wherein the first information comprises at least one of: a non-zero Linear Combination (LC) coefficient, a frequency domain component, a polarization direction, and an order between layers.

According to a second aspect, an embodiment of the present disclosure provides a data processing device, including a processing module;
  wherein the processing module is configured to obtain first Channel State Information (CSI); and
  wherein the processing module is further configured to determine second CSI in the first CSI according to first information, wherein the first information comprises at least one of: a non-zero Linear Combination (LC) coefficient, a frequency domain component, a polarization direction, or an order between layers.

According to a third aspect, an embodiment of the present disclosure provides a terminal device, including a transceiver, a processor and a memory;
  wherein the memory stores computer-executable instructions;
  wherein the processor executes the computer-executable instructions stored in the memory to cause the processor to perform the data processing method.

According to a fourth aspect, an embodiment of the present disclosure provides a computer-readable storage medium having computer-executable instructions stored thereon, wherein when the computer-executable instructions are executed by a processor, the processor is caused to perform the data processing method.

In the data processing method and device, an apparatus and a storage medium according to embodiments of the present disclosure, after the terminal device obtains the first CSI, the terminal device determines the second CSI in the first CSI according to the first information, and the first information includes at least one of: a non-zero Linear Combination (LC) coefficient, a frequency domain component, a polarization direction, or an order between layers. A network device can determine the CSI reported by the terminal device according to the second CSI. Since the second CSI is a part of the first CSI, the contents in the first CSI are reduced, so that the terminal device can complete transmission of the second CSI according to the resources allocated to the terminal device by the network device. After omitting part of the non-zero LC coefficients in the first CSI according to the foregoing method to obtain the second CSI, the network device can still perform determination to obtain part of the channel state information according to the second CSI. The above method for omitting the contents in the first CSI is applicable to the Rel.16 codebook.

BRIEF DESCRIPTION OF THE DRAWINGS

FIG. 8 is a schematic diagram showing another ranking of non-zero LC coefficients in a layer according to an embodiment of the present disclosure.

FIG. 9 is a schematic diagram showing another ranking of non-zero LC coefficients in a layer according to an embodiment of the present disclosure.

FIG. 10 is a schematic diagram showing another ranking of non-zero LC coefficients in a layer according to an embodiment of the present disclosure.

DETAILED DESCRIPTION

Figure 1:
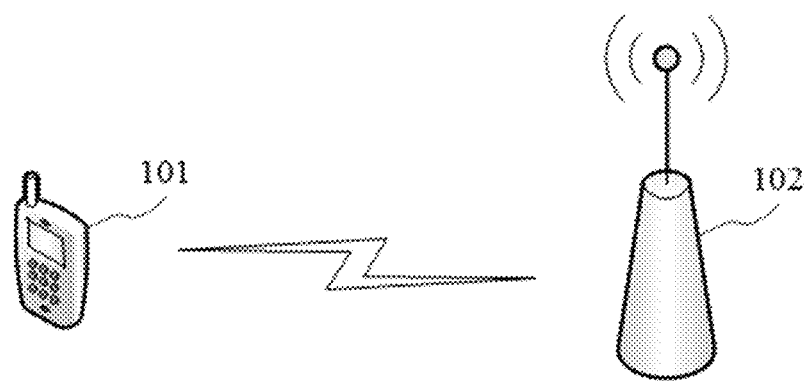
FIG. 1 is a schematic diagram of a communication system architecture to which embodiments of the present disclosure are applicable.

In order to facilitate the understanding of the present disclosure, the communication system applicable to the present disclosure and devices involved in the present disclosure are first introduced.

The technical solutions in the present disclosure can be applied to the fifth generation mobile communication technology (5G) system, and the 5G system can also be referred to as the fifth generation mobile communication technology New Radio (NR) system. The technical solutions in the present disclosure can also be applied to the Long Term Evolution (LTE) system, or can be applied to the Universal Mobile Telecommunications System (UMTS) terrestrial radio access network (UTRAN) system, or a GSM EDGE radio access network (GERAN) architecture of Global System for Mobile communication (GSM)/enhanced data rate for GSM Evolution (EDGE) system. The technical solutions in the present disclosure can also be applied to other communication systems, such as the Public Land Mobile Network (PLMN) system, a communication system after 5G, etc., and embodiments of the present disclosure do not impose specific limitations on this.

The present disclosure relates to terminal device. The terminal device may be a device that includes wireless transceiving functions and can cooperate with a network device to provide users with communication services. The terminal device can refer to an industrial robot, industrial automation equipment, terminal equipment, user equipment (UE), access terminal, user unit, user station, mobile station, mobile device, remote station, remote terminal, mobile equipment, user terminal, terminal, wireless terminal equipment, user agent or user device. For example, the terminal device may be a cellular phone, a cordless phone, a session initiation protocol (SIP) phone, a wireless local loop (WLL) station, a personal digital assistant (PDA), a handheld device with a wireless communication function, a computing device or other processing device connected to a wireless modem, an in-vehicle device, a wearable device, a terminal devices in 5G networks or networks after 5G, for example, a V2X terminal device in the LTE network, or a V2X terminal device in 5G networks, and so on, and embodiments of the present disclosure do not impose specific limitations on this.

The present disclosure also relates to a network device, which may be a device used to communicate with the terminal device. The network device may be a next generation base station (next generation NodeB, gNB) or a next generation evolved base station (next generation-evolved NodeB, ng-eNB). The gNB provides UE with new radio (NR) user plane functions and control plane functions, and ng-eNB provides UE with evolved universal terrestrial radio access (E-UTRA) user plane Functions and control plane functions. It should be noted that gNB and ng-eNB are only a kind of names used to indicate base stations that support a 5G network system, and should not be construed as constituting any limitation on the present disclosure. The network device can also be a base transceiver station (BTS) in a GSM system or a CDMA system, a base station (nodeB, NB) in a WCDMA system, or an evolutional node B (eNB or eNodeB) in the LTE system. Alternatively, the network device may be a relay station, an access point, an in-vehicle device, a wearable device, a network side device in networks after 5G or a network device in the future evolved PLMN network, a road site unit (RSU)), and so on.

FIG. 1 is a schematic diagram of a communication system architecture to which embodiments of the present disclosure are applicable. Referring to FIG. 1, the communication system includes a terminal device 101 and a network device 102. The terminal device 101 may perform channel measurement to obtain Channel State Information (CSI), and the terminal device 101 may send the collected CSI to the network device 102.

Before the terminal device sends the CSI to the network device, the network device allocates a Physical Uplink Shared Channel (PUSCH) resource to the terminal device, and the terminal device sends the CSI to the network device by the PUSCH resource. However, the PUSCH resource allocated by the network device to the terminal device may be less than the resource required by the terminal device to send the CSI. In this case, the terminal device can omit part of the contents in the CSI.

After the terminal device omits a part of the contents in the CSI, the to-be-transmitted CSI is obtained. The terminal device can send the to-be-transmitted CSI, or map the to-be-transmitted CSI into Uplink Control Information (UCI), and send the UCI to the network device. Mapping CSI to UCI refers to mapping multiple fields of the CSI to the UCI bit sequence in a certain order. The contents included in the CSI may also be referred to as codebook information.

According to some embodiments, the terminal device may first omit a part of the contents in the CSI, and then map the remaining contents in the CSI to UCI.

In order to facilitate the understanding of the present disclosure, parameters involved in the present disclosure will be described first by Table 1.

TABLE 1

| Parameter | Description | Relationship |
|---|---|---|
| Nsb | number of subbands reported by CSI | higher-layer configured |
| R | take the value of 1 or 2 | higher-layer configured |
| N3 | number of frequency domain (FD) compression units (number of FD basis vectors) | N3 = Nsb*R |
| L | number of spatial domain (SD) basis vectors selected by UE | higher-layer configured |
| β | used for configuring the largest number of non-zero linear combination (LC) coefficients | higher-layer configured |
| p | used for configuring the number of FD basis vectors selected by UE | higher-layer configured |
| M | number of FD basis vectors selected by UE | M = ceil(p*N3/R) |
| K0 | the largest number of non-zero LC coefficients | K0 = ⌈β * 2LM⌉ |

TABLE 1-continued

| Parameter | Description | Relationship |
|---|---|---|
| $K_{Nz, tot}$ | number of non-zero LC coefficients for all layers | |

According to some embodiments, the CSI includes codebook information for multiple layers. According to some embodiments, the terminal device can select a number of layers from multiple numbers of layers which the terminal device supports. For example, the number of layers supported by the terminal device can be as shown in Table 2:

TABLE 2

| Number of layers | layer | L | P |
|---|---|---|---|
| 1 | 0 | $x_0$ | $y_0$ |
| 2 | 0 | | |
| | 1 | | |
| 3 | 0 | | $v_0$ |
| | 1 | | |
| | 2 | | |
| 4 | 0 | | |
| | 1 | | |
| | 2 | | |
| | 3 | | |

Referring to Table 2, the number of layers can be preconfigured as 1 or 2 or 3 or 4. When the number of layers is 1, there is one layer. When the number of layers is 2, there are two layers. When the number of layers is 3, there are layers. When the number of layers is 4, there are four layers. The y0 and v0 are configured by a higher layer. For example, (y0, v0) can be selected from the following parameters: {(½, ¼), (¼, ¼), (¼, ⅛)}.

In order to facilitate the understanding of the present disclosure, the codebook structure of the codebook information is described below:

(1) For any Layer, Precoding is Performed Through a Matrix $W=W_1 \tilde{W}_2 W_f^H$ with a Size of P×N$_3$.

P is the number of SD compression units (the number of SD basis vectors included), and $P=2N_1N_2$. $N_3$ is the number of FD compression units (the number of FD basis vectors included).

Precoder normalization: the precoding matrix for given rank and unit of $N_3$ is normalized to norm 1/sqrt(rank).

(2) SD Compression

L spatial domain basis vectors are selected, and because basis vectors in two polarization directions are the same, a total of 2L spatial domain basis vectors are selected.

Compression in spatial domain is performed through the following matrix: $W_1=$ $$\begin{bmatrix} v_0 v_1 \dots v_{L-1} & 0 \\ 0 & v_0 v_1 \dots v_{L-1} \end{bmatrix};$$

where $\{v_i\}_{i=0}^{L-1}$ are $N_1N_2 \times 1$ orthogonal DFT vectors (same as Rel. 15 Type II).

(3) Frequency Domain (FD) Compression

Compression in spatial domain is performed through the following matrix: $W_f=[W_{f(0)}, \dots, W_{f(2L-1)}]$; where $W_f(i)=[f_{k_{i,0}} f_{k_{i,1}}, \dots, f_{k_{i,Mi-1}}]$, $\{f_{k_{i,m}}\}_{m=0}^{M_i-1}$ are $M_i$ size-$N_3 \times 1$ orthogonal DFT vectors, $i=0, \dots, 2L-1$, and $M_i$ is determined by M.

Common basis vectors: $W_f=[f_{k_0} f_{k_1} \dots f_{k_{M-1}}]$, that is, $M_i=M \forall i$ and $\{k_{i,m}\}_{m=0}^{M_i-1}$ are identical, $k_{i,m}=k_m$, $i=0, \dots, 2L-1$;

where $\{k_m\}_{m=0}^{M-1}$ or $\{k_{i,m}\}_{m=0}^{M_i-1}$ $i=0, \dots, 2L-1$ are all selected from the index set $\{0,1, \dots, N_3-1\}$ from the same orthogonal basis group.

(4) Linear Combination Coefficients for any Layer $\tilde{W}_2$ is composed of K=2LM or $K=\sum_{i=0}^{2L-1} M_i$ linear combination coefficients.

According to some embodiments, in Rel. 16 NR type II, the codebook can be expressed as:

$$W=W_1 \tilde{W}_2 W_f^H$$

where $W_1$ indicates 2L spatial beams, $W_f^H$ is used to determine M DFT basis vectors, and $\tilde{W}_2$ (2L*M) indicates the weight coefficient of any pair of spatial beam and frequency domain DFT vector.

The CSI sent by the terminal device to the network device includes: L beams for $W_1$, M DFT bases indicated by $W_f^H$, and quantized $\tilde{W}_2$. The network device can obtain the CSI for each layer of the downlink through the product of the three values.

In embodiments of the present disclosure, when omitting a part of the contents in the CSI, some non-zero LC coefficients in $\tilde{W}_2$ in the CSI are omitted. The non-zero LC coefficients will be described below with reference to FIG. 2. A non-zero LC coefficient is the non-zero part of a LC coefficient, and the non-zero LC coefficient refers to a weighted coefficient of a SD basis vector and a FD basis vector.

Figure 2:
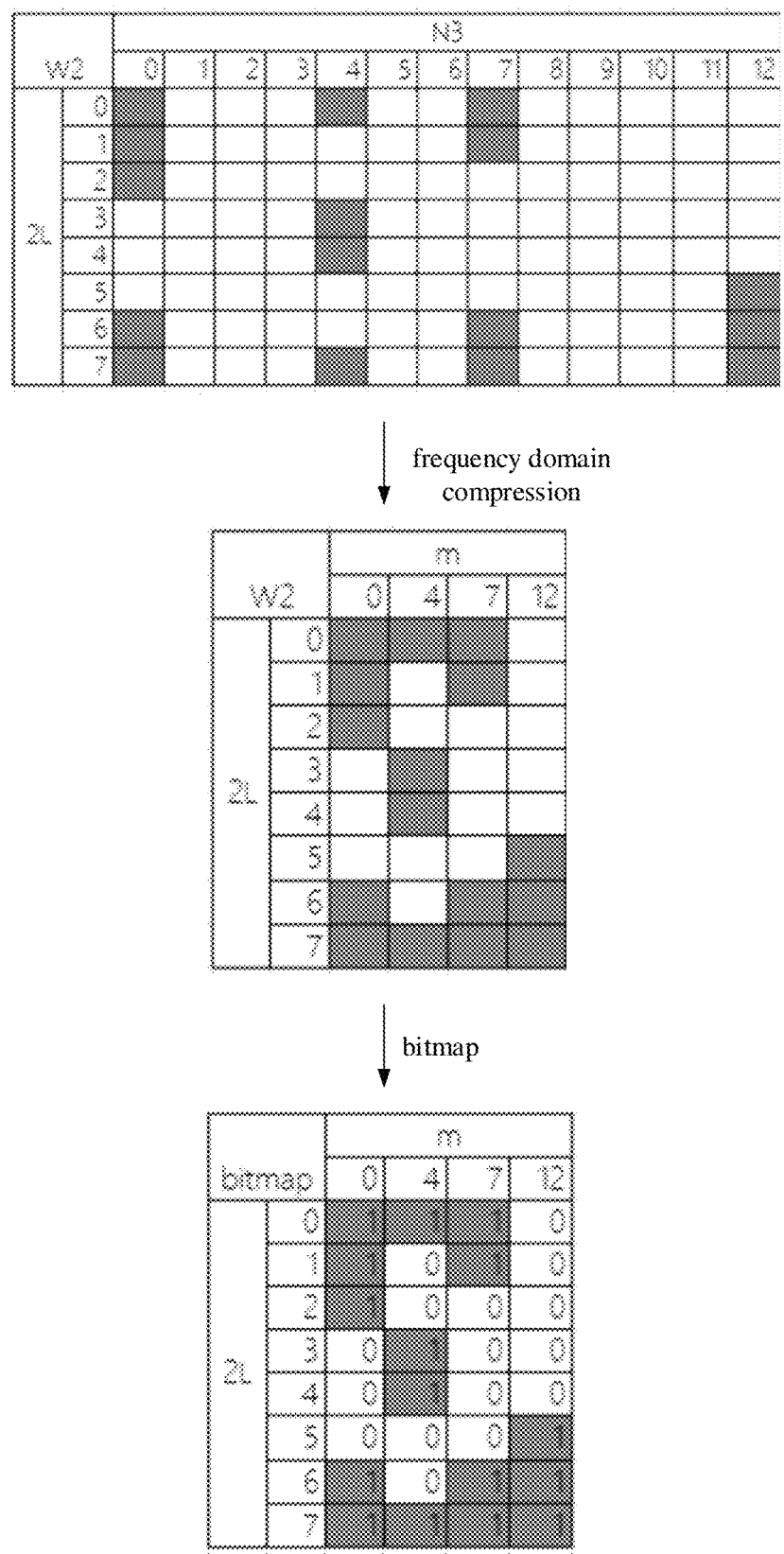
FIG. 2 is a schematic diagram of a non-zero LC coefficient according to an embodiment of the present disclosure.

FIG. 2 is a schematic diagram of a non-zero LC coefficient according to an embodiment of the present disclosure. Refer to FIG. 2, N3 in the first row represents the number of FD basis vectors, and 0, 1, . . . , 12 in the second row represent the indexes of FD basis vectors. In FIG. 2, there are thirteen FD basis vectors. The 2L in the first column represents the number of SD basis vectors, and 0, 1, . . . , 7 in the second column represent the indexes of the SD basis vectors. In FIG. 2, four SD basis vectors are included.

In FIG. 2, the gray areas indicate the locations where non-zero LC coefficients exist. For example, frequency domain compression can be performed based on the positions of the non-zero LC coefficients. Through the FD basis vectors and SD basis vectors corresponding to the positions of the non-zero element (1) in the bitmap, the positions of the non-zero LC coefficients in $\tilde{W}$ can be determined.

Hereinafter, the polarization direction will be described with reference to FIG. 3.

Figures 3, 4:
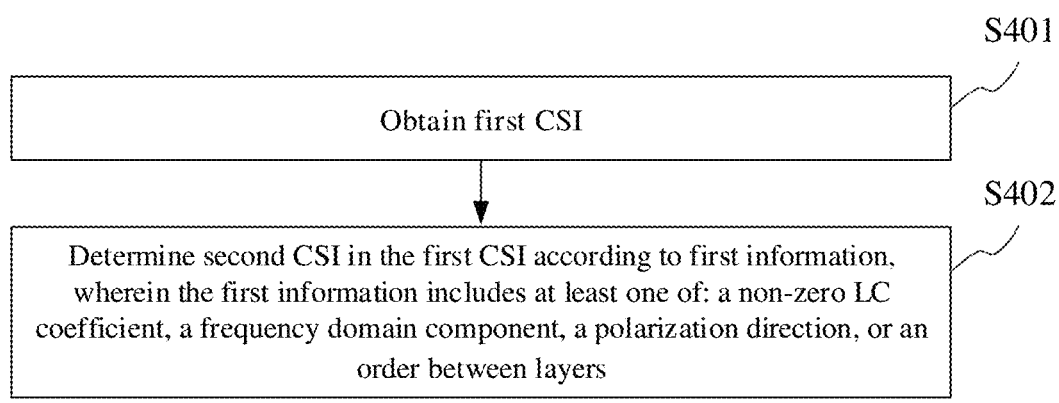
FIG. 3 is a schematic diagram of another non-zero LC coefficient according to an embodiment of the present disclosure.
FIG. 4 is a schematic flowchart of a data processing method according to an embodiment of the present disclosure.

FIG. 3 is a schematic diagram of another non-zero LC coefficient according to an embodiment of the present disclosure. Referring to FIG. 3, there is a strongest coefficient (SC) in the non-zero LC coefficients. A polarization direction including the SC is a strong polarization direction (Pol1), and a polarization direction not including the SC is a weak polarization direction (Pol2).

In the following, exemplary embodiments are provided to describe the process for the terminal device to determine a part of the contents to be sent in the CSI. It should be noted that the following embodiments can exist independently or can be combined with each other, and the same or similar contents will not be repeated in different embodiments.

FIG. 4 is a schematic flowchart of a data processing method according to an embodiment of the present disclosure. The steps in FIG. 4 may be performed by a terminal device. Referring to FIG. 4, the method may include the following steps:

In S401, first CSI is obtained.

According to some embodiments, the first CSI may be information before encoding. In this case, the terminal device can obtain the first CSI by measurement.

According to some other embodiments, the first CSI may be encoded information. In this case, the first CSI may include codebook information, that is, the terminal device may first obtain the CSI by measurement, and then encode the CSI obtained by measurement to obtain the first CSI.

According to some embodiments, the first CSI includes at least one non-zero LC coefficient. The first CSI may further include at least one of a spatial domain basis indicator, a frequency domain basis indicator, a strongest coefficient indicator, a reference amplitude, or a bitmap.

In S402, second CSI is determined in the first CSI according to first information. the first information comprises at least one of: a non-zero LC coefficient, a frequency domain component, a polarization direction, and an order between layers.

According to some embodiments, the terminal device may perform S402 when it is determined that the PUSCH resource allocated by the network device is less than the resource required for transmitting the first CSI.

It should be noted that when the PUSCH resource allocated to the terminal device is greater than or equal to the resource required to transmit the first CSI, S402 can also be performed, so that the amount of data to be transmitted can be reduced and the power consumption can be reduced.

According to some embodiments, a frequency domain component (FD component) includes a non-zero LC coefficient corresponding to a frequency domain basis vector. For example, the non-zero LC coefficients in a column are a frequency domain component. Referring to FIG. 2, the non-zero LC coefficient corresponding to the frequency domain basis vector with an index of "0" (FD-basis0) is a frequency domain component, and the non-zero LC coefficient corresponding to the frequency domain basis vector with an index of "4" (FD-basis4) is a frequency domain component.

According to some embodiments, the polarization direction includes a strong polarization direction and a weak polarization direction.

According to some embodiments, the order between layers refers to the order between at least one layer selected by the terminal device.

The second CSI is a part of the first CSI, so that the PUSCH resources required for transmitting the second CSI are less than the PUSCH resources required for transmitting the first CSI. The network device may determine a part of the channel state information in the first CSI according to the second CSI.

The terminal device may determine a to-be-transmitted non-zero LC coefficient among the at least one non-zero LC coefficient according to the first information. The to-be-transmitted non-zero LC coefficient refers to a non-zero LC coefficient to be sent by the terminal device to the network device. The terminal device may omit a non-zero LC coefficient other than the to-be-transmitted non-zero LC coefficient in the first CSI to obtain the second CSI. The second CSI includes the to-be-transmitted non-zero LC coefficient and other contents in the first CSI than the non-zero LC coefficient. Alternatively, the terminal device may determine a to-be-omitted non-zero LC coefficient among the at least one non-zero LC coefficient according to the first information. The to-be-omitted non-zero LC coefficient is a non-zero LC coefficient that the terminal device does not send to the network device. The terminal device may omit the to-be-omitted non-zero LC coefficient in the first CSI to obtain the second CSI, and the second CSI includes other contents in the first CSI than the to-be-omitted non-zero LC coefficient.

According to some embodiments, the terminal device may also select a part of the contents in the first CSI according to the first information as the contents in the second CSI.

According to some embodiments, the second CSI may include the remaining non-zero LC coefficients. The second CSI may also include at least one of a spatial domain basis indicator, a frequency domain basis indicator, a strongest coefficient indicator, a reference amplitude, or a bitmap. The omission of non-zero LC coefficients by the terminal device has no effect on the spatial domain basis indicator, the frequency domain basis indicator, the strongest coefficient indicator, the reference amplitude, or the bitmap.

After the terminal device determines that the second CSI is obtained, the terminal device may send the second CSI, or the terminal device may map the contents in the second CSI to UCI and send the UCI to the network device.

In the data processing method according to embodiments of the present disclosure, after the terminal device obtains the first CSI, the terminal device determines the second CSI in the first CSI according to the first information, and the first information includes at least one of: a non-zero Linear Combination (LC) coefficient, a frequency domain component, a polarization direction, or an order between layers. A network device can determine the CSI reported by the terminal device according to the second CSI. Since the second CSI is a part of the first CSI, the contents in the first CSI are reduced, so that the terminal device can complete transmission of the second CSI according to the resources allocated to the terminal device by the network device. After omitting part of the non-zero LC coefficients in the first CSI according to the foregoing method to obtain the second CSI, the network device can still perform determination to obtain part of the channel state information according to the second CSI. The above method for omitting the contents in the first CSI is applicable to the Rel.16 codebook.

On the basis of any of the foregoing embodiments, the method for determining the to-be-transmitted non-zero LC coefficient will be described below.

Figures 5, 6:
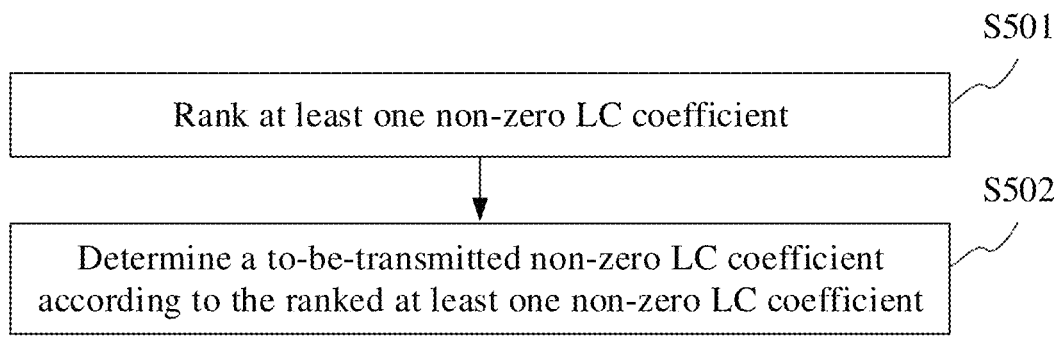
FIG. 5 is a schematic flowchart of a method for determining a to-be-transmitted non-zero LC coefficient according to an embodiment of the present disclosure.
FIG. 6 is a schematic diagram showing ranking of non-zero LC coefficients within a layer according to an embodiment of the present disclosure.

A method for determining the to-be-transmitted non-zero LC coefficient will be introduced with reference to FIG. 5. In FIG. 5, the contents in the first information may include the following cases:

In case 1, the first information includes a non-zero LC coefficient.

In case 2, the first information includes a non-zero LC coefficients and an order between layers.

In case 3, the first information includes a non-zero LC coefficient and a polarization direction.

In case 4, the first information includes a non-zero LC coefficient, a polarization direction, and an order between layers.

FIG. 5 is a schematic flowchart of a method for determining a to-be-transmitted non-zero LC coefficient according to an embodiment of the present disclosure. Referring to FIG. 5, the method may include:

In S501, the at least one non-zero LC coefficient is ranked.

According to some embodiments, first, non-zero LC coefficients for each layer are ranked, and then the at least one non-zero LC coefficient is ranked according to a layer which each of the non-zero LC coefficients belongs to and the ranked non-zero LC coefficients for each layer.

According to some embodiments, the at least one non-zero LC coefficient can be ranked by at least the following three implementations:

First Implementation:

In the first implementation, the first information includes at least a non-zero LC coefficient.

First, non-zero LC coefficients for each layer are ranked, and then the ranked non-zero LC coefficients for layers are alternately arranged. According to some embodiments, the first information may further include an order between layers, and accordingly, the ranked non-zero LC coefficients for layers may be alternately arranged according to the order between layers.

When ranking the non-zero LC coefficients for each layer, the non-zero LC coefficients can be ranked according to indexes of FD basis vectors and indexes of SD basis vectors corresponding to the non-zero LC coefficients. After the non-zero LC coefficients for each layer are ranked, indexes of frequency domain basis vectors corresponding to the non-zero LC coefficients are sequentially incremented, and indexes of spatial domain basis vectors corresponding to non-zero LC coefficients which correspond to frequency domain basis vectors with same indexes are sequentially incremented.

For example, it is assumed that a LC coefficient for the r-th layer corresponding to a l-th SD basis vector and a m-th FD basis vector is $c_{r,l,m}$, r<RI, l<2L, m<M, and M is the number of FD basis vectors selected by a user. The LC coefficient includes a differential amplitude indicator ($p_{diff}$(l,m)) and its corresponding phase indicator. For non-zero LC coefficients for any layer, after the non-zero LC coefficients are ranked according to the first implementation, m is sequentially increased, and when m corresponding to multiple non-zero LC coefficients is the same, l is sequentially increased.

The process of ranking non-zero LC coefficients for a layer in the first implementation manner will be described with reference to FIG. 6.

FIG. 6 is a schematic diagram showing ranking of non-zero LC coefficients within a layer according to an embodiment of the present disclosure. Referring to FIG. 6, according to the order of m from small to large, the non-zero LC coefficients in each column are ranked separately. When ranking the non-zero LC coefficients in each column, the non-zero LC coefficients are ranked in an ascending order of the indexes of the SD basis vectors. For example, first, four non-zero LC coefficients (not including SC) in the column where m=0 are ranked, and the ranking order is as shown by the arrow, and then four non-zero LC coefficients in the column where m=4 are ranked, and the ranking order is shown by the arrow, and so on, until all the non-zero LC coefficients for the layers shown in FIG. 6 are ranked.

Referring to FIG. 6, it is assumed that the layer shown in FIG. 6 is the 0-th layer, the ranked non-zero LC coefficients are as follows: $c_{0,0,0}$, $c_{0,2,0}$, $c_{0,6,0}$, $c_{0,7,0}$, $c_{0,0,4}$, $c_{0,3,4}$, $c_{0,4,4}$, $c_{0,7,4}$, $c_{0,0,7}$, $c_{0,1,7}$, $c_{0,6,7}$, $c_{0,7,7}$, $c_{0,5,12}$, $c_{0,6,12}$, $c_{0,7,12}$.

The process of ranking the non-zero LC coefficients between layers in the first implementation manner will be described below with reference to FIG. 7.

Figure 7:
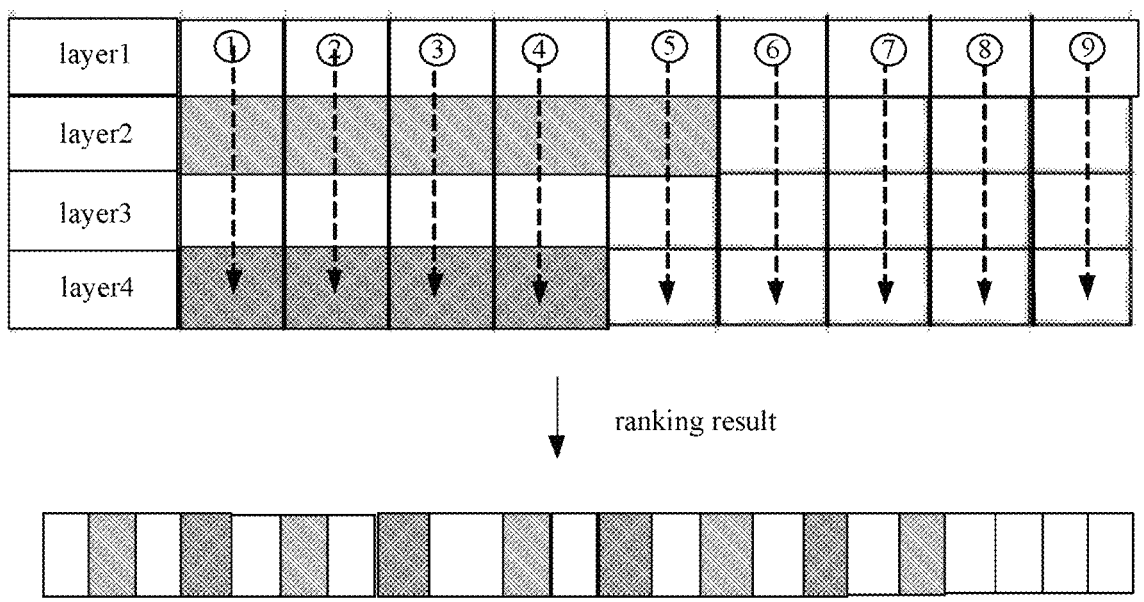
FIG. 7 is a schematic diagram showing ranking of non-zero LC coefficients among layers according to an embodiment of the present disclosure.

FIG. 7 is a schematic diagram showing ranking of non-zero LC coefficients between layers according to an embodiment of the present disclosure. Referring to FIG. 7, the gray positions in each row refer to the non-zero LC coefficients for a layer after ranking. For example, layer 1 includes nine ranked non-zero LC coefficients, layer 2 includes five ranked non-zero LC coefficients, and layer 3 and layer 4 each includes four ranked non-zero LC coefficients. When performing ranking between layers, first, the non-zero LC coefficients in each column are ranked from left to right. The non-zero LC coefficients in each column are ranked according to the order of the layers. For example, it is assumed that the order of the layers is: layer 1, layer 2, layer 3, and layer 4. First, the non-zero LC coefficients in the first column are ranked, and the ranking order is shown by the arrow; the non-zero LC coefficients in the second column are ranked, and the ranking order is shown by the arrow, and so on, until the ranking of the nine columns of non-zero LC coefficients in FIG. 7 is completed. It should be noted that LC coefficients with an amplitude of 0 can affect the order of non-zero LC coefficients. The order of non-zero LC coefficients is equivalent to an order which is obtained after the non-zero and zero LC coefficients are ranked and the LC coefficients with an amplitude of 0 are removed.

The first implementation will be described with examples.

Exemplarily, it is supposed that a user chooses to transmit data through two layers, the two layers being layer 0 and layer 1, respectively. It is assumed that the non-zero LC coefficients for the 0-th layer include: $c_{0,0,2}$, $c_{0,1,0}$, $c_{0,1,1}$, $c_{0,2,0}$, $c_{0,2,3}$. The non-zero LC coefficients for the 0-th layer after ranking according to the above method are: $c_{0,1,0}$, $c_{0,2,0}$, $c_{0,1,1}$, $c_{0,0,2}$, $c_{0,2,3}$. It is assumed that the non-zero LC coefficients for the first layer include: $c_{1,0,0}$, $c_{1,1,2}$, $c_{1,1,1}$, $c_{1,2,3}$. The non-zero LC coefficients for the first layer after ranking according to the above method are: $c_{1,0,0}$, $c_{1,1,1}$, $c_{1,1,2}$, $c_{1,2,3}$. After alternately arranging the non-zero LC coefficients for the two layers, the result is: $c_{0,1,0}$, $c_{1,0,0}$, $c_{0,2,0}$, $c_{1,1,1}c_{0,1,1}$, $c_{1,1,2}$, $c_{0,0,2}$, $c_{1,2,3}$, $c_{0,2,3}$. In another example, the coefficients for the first layer are a0bc0d, the order for the second layer is 0e0f0g, and the coefficients after the alternate arrangement are a00eb0cf00dg, and the order of the non-zero coefficients is aebcfdg.

In the first implementation, the process of ranking non-zero LC coefficients is simple and convenient, and among the non-zero LC coefficients after ranking, a non-zero LC coefficients corresponding to a FD basis vector with a smaller index is given a higher ranking.

Second Implementation:

In the second implementation, the first information includes at least a non-zero LC coefficient.

The non-zero LC coefficients for each layer are ranked first, and then the ranked non-zero LC coefficients for layers are alternately arranged. According to some embodiments, the first information may further include an order between layers, and accordingly, the ranked non-zero LC coefficients for layers may be alternately arranged according to the order between layers.

When ranking the non-zero LC coefficients for each layer, the non-zero LC coefficients can be ranked according to cyclic distances between FD basis vectors corresponding to the non-zero LC coefficients and a first frequency domain basis vector and indexes of SD basis vectors. After ranking the non-zero LC coefficients for each layer, cyclic distances S between frequency domain basis vectors corresponding to the non-zero LC coefficients and the first frequency domain basis vector are sequentially incremented, and indexes of spatial domain basis vectors corresponding to non-zero LC coefficients which correspond to frequency domain basis vectors with same indexes are sequentially incremented. The first frequency domain basis vector is a frequency domain basis vector with an index of 0; if $k_m \leq [N_3/2]$, then $S=k_m$; if $k_m > [N_3/2]$, then $S=N_3-k_m$, $k_m$ is an index of a frequency domain basis vector corresponding to a non-zero LC coefficient, $N_3$ is the number of the frequency domain basis vectors for the current layer, and $[N_3/2]$ refers to rounding up $N_3/2$.

Third Implementation:

In the third implementation, the first information includes at least a non-zero LC coefficient.

The non-zero LC coefficients for each layer are ranked first, and then the ranked non-zero LC coefficients for respective layers are alternately arranged. According to some embodiments, the first information may further include an order between layers, and accordingly, the ranked non-zero LC coefficients for respective layers may be alternately arranged according to the order between layers.

When the non-zero LC coefficients for each layer are ranked, the non-zero LC coefficients can be ranked according to priorities of the non-zero LC coefficients. After the non-zero LC coefficients for each layer are ranked, the priorities of the non-zero LC coefficients are sequentially incremented.

According to some embodiments, the smaller the priority value, the higher the priority of a frequency domain basis vector. Or, the larger the priority value, the higher the priority of the frequency domain basis vector. In the following, we take the situation where the smaller the priority value, the higher the priority of the frequency domain basis vector as an example for description. The priority of a non-zero LC coefficient can be determined in the following two methods:

Method 1: The priority of a non-zero LC coefficient can be determined according to a cyclic distance S between a FD basis vector corresponding to the non-zero LC coefficient and the first frequency domain basis vector.

According to some embodiments, the cyclic distance between the FD basis vector corresponding to the non-zero LC coefficient and the first frequency domain basis vector is negatively related to the priority of the non-zero LC coefficient. For example, the smaller the cyclic distance between the FD basis vector corresponding to the non-zero LC coefficient and the first frequency domain basis vector, the higher the priority of the non-zero LC coefficient.

When cyclic distances between frequency domain basis vectors corresponding to multiple (two or more) non-zero LC coefficients and the first frequency domain basis vector are the same, indexes of the frequency domain basis vectors corresponding to the non-zero LC coefficients are positively related to the priorities of the non-zero LC coefficients. For example, the smaller the index of the frequency domain basis vector corresponding to a non-zero LC coefficient, the lower the priority of the non-zero LC coefficient. Or, when cyclic distances between frequency domain basis vectors corresponding to multiple (two or more) non-zero LC coefficients and the first frequency domain basis vector are the same, indexes of the frequency domain basis vectors corresponding to the non-zero LC coefficients are negatively related to the priorities of the non-zero LC coefficients. For example, the smaller the index of the frequency domain basis vector corresponding to a non-zero LC coefficient, the higher the priority corresponding to the non-zero LC coefficient.

The cycle distance and priority will be described below by examples.

Exemplarily, it is assumed that a total of thirteen frequency domain basis vectors are included. Accordingly, there are a total of thirteen indexes. It is assumed that the thirteen indexes are integers between 0 and 12. If a smaller index of a frequency domain basis vector correspond to a higher priority of the frequency domain basis vector, the cyclic distance of each frequency domain basis vector is shown in Table 3:

TABLE 3

| | indexes of frequency domain basis vectors | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| cyclic distances | 0 | 1 | 2 | 3 | 4 | 5 | 6 | 7 | 5 | 4 | 3 | 2 | 1 |
| priorities | 0 | 1 | 3 | 5 | 7 | 9 | 11 | 12 | 10 | 8 | 6 | 4 | 2 |

For another example, it is assumed that a total of thirteen frequency domain basis vectors are included. Accordingly, there are a total of thirteen indexes. It is assumed that the thirteen indexes are integers between 0 and 12. If a smaller index of a frequency domain basis vector correspond to a lower priority of the frequency domain basis vector, the cyclic distance of each frequency domain basis vector is shown in Table 4:

TABLE 4

| | indexes of frequency domain basis vectors | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| cyclic distances | 0 | 1 | 2 | 3 | 4 | 5 | 6 | 7 | 5 | 4 | 3 | 2 | 1 |
| priorities | 0 | 2 | 4 | 6 | 8 | 10 | 12 | 11 | 9 | 7 | 5 | 3 | 1 |

Method 2: The priority of a non-zero LC coefficient can be determined according to an index of a FD basis vector corresponding to the non-zero LC coefficient.

In this way, the priority of non-zero LC coefficients can be determined in the following three manner:

In a first manner, when cyclic distances between frequency domain basis vectors corresponding to multiple (two or more) non-zero LC coefficients and the first frequency domain basis vector are the same, if a smaller index of a frequency domain basis vector corresponding to a non-zero LC coefficient corresponds to a lower priority of the non-zero LC coefficient, the priorities of the non-zero LC coefficients can be: $\min(2k_m, 2(N_3-k_m)-1)$; where $k_m$ is an index of the frequency domain basis vector corresponding to any one of the non-zero LC coefficients, and $N_3$ is the number of frequency domain basis vectors.

In a second manner, when cyclic distances between frequency domain basis vectors corresponding to multiple (two or more) non-zero LC coefficients and the first frequency domain basis vector are the same, if a smaller index of a frequency domain basis vector corresponding to a non-zero LC coefficient corresponds to a higher priority of the non-zero LC coefficient, the priorities of the non-zero LC coefficients can be:

$$\begin{cases} \min(2k_m+1, 2(N_3-k_m)) & \text{if } k_m \neq 0 \\ 0 & \text{if } k_m = 0 \end{cases}$$

where $k_m$ is an index of the frequency domain basis vector corresponding to any one of the non-zero LC coefficients, and $N_3$ is the number of frequency domain basis vectors.

In a third manner, the priorities of the frequency domain basis vectors corresponding to the non-zero LC coefficients can be:

$$\min(2k_m, 2(N_3 - k_m) - 1), \text{ or}$$

$$\begin{cases} \min(2k_m + 1, 2(N_3 - k_m)) & \text{if } k_m \neq 0 \\ 0 & \text{if } k_m = 0 \end{cases}$$

Next, the process of ranking non-zero LC coefficients for a layer in the third implementation will be described below with reference to FIG. 8.

Figure 8:
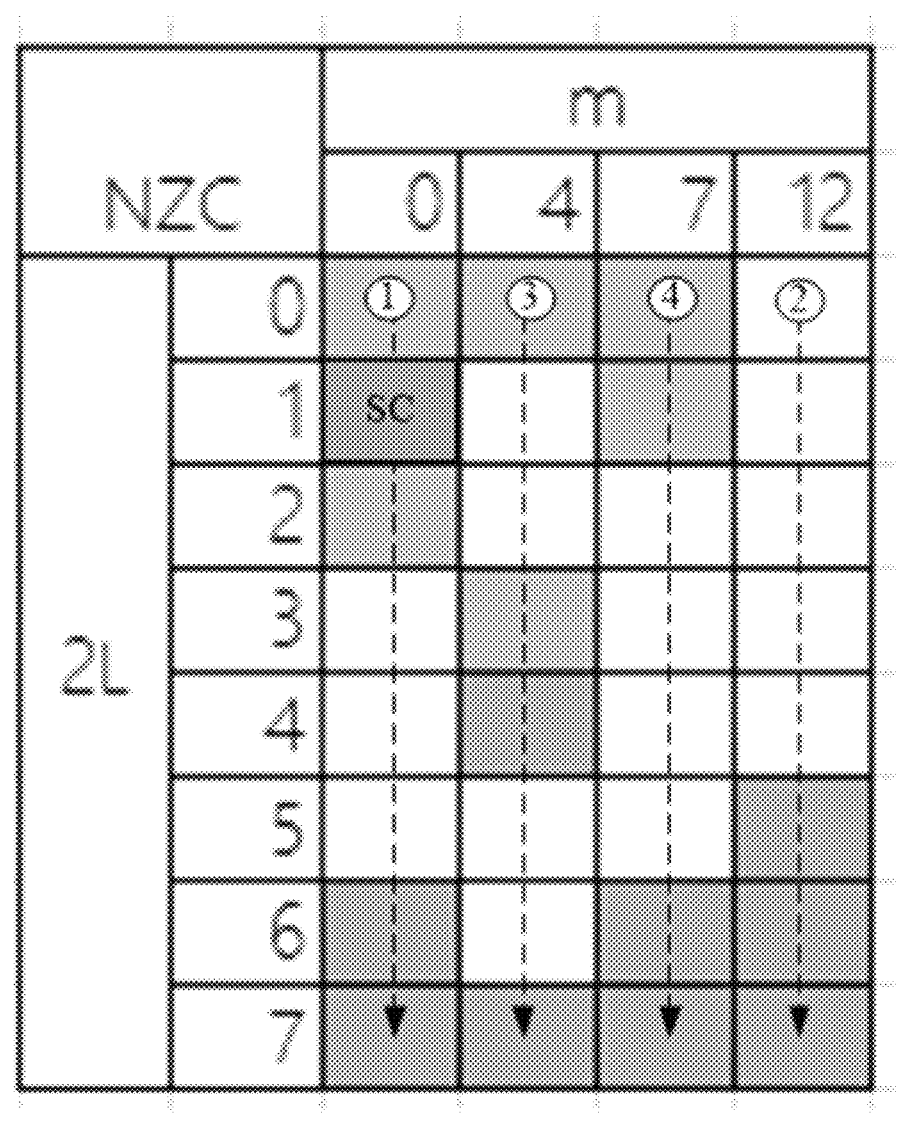

FIG. 8 is a schematic diagram showing another ranking of non-zero LC coefficients for a layer according to an embodiment of the present disclosure. Referring to FIG. 8, indexes and priorities of the frequency domain basis vectors are shown in Table 3. According to the order of priority from high to low (the value of priority is from small to large), ranking of the non-zero LC coefficients in respective columns is performed. When non-zero LC coefficients in each column are ranked, the non-zero LC coefficients in the column are ranked in an ascending order of indexes of SD basis vectors. For example, first, four non-zero LC coefficients (not including SC) in the column where m=0 are ranked, and the ranking order is as shown by the arrow; then, three non-zero LC coefficients in the column where m=12 are ranked, and the ranking order is as shown by the arrow; then, four non-zero LC coefficients in the column where m=4 are ranked, and the ranking order is as shown by the arrow; then, four non-zero LC coefficients in the column where m=7 are ranked, and the ranking order is as shown by the arrow.

Referring to FIG. 8, it is assumed that the layer shown in FIG. 8 is the 0-th layer, the ranked non-zero LC coefficients are as follows: $c_{0,0,0}$, $c_{0,2,0}$, $c_{0,6,0}$, $c_{0,7,0}$, $c_{0,5,12}$, $c_{0,6,12}$, $c_{0,7,12}$, $c_{0,0,4}$, $c_{0,3,4}$, $c_{0,4,4}$, $c_{0,7,4}$, $c_{0,0,7}$, $c_{0,1,7}$, $c_{0,6,7}$, $c_{0,7,7}$.

It should be noted that, in the second implementation, the way of ranking between layers (alternating ranked non-zero LC coefficients for respectively layers) can refer to the ranking method shown in FIG. 7, and detailed descriptions will be omitted here.

In the second implementation, the process of ranking non-zero LC coefficients is simple and convenient, and among the ranked non-zero LC coefficients, non-zero LC coefficients corresponding to FD basis vectors which have a smaller cyclic distance from the first frequency domain basis vector are given a higher ranking.

Fourth Implementation:

In the third implementation, the first information includes at least a non-zero LC coefficient and a polarization direction.

The non-zero LC coefficients for each layer are ranked first, and then the ranked non-zero LC coefficients for respective layers are alternately arranged. According to some embodiments, the first information may further include an order between layers, and accordingly, the ranked non-zero LC coefficients for respective layers may be alternately arranged according to the order between layers.

When ranking the non-zero LC coefficients for each layer, first, non-zero LC coefficients for the layer in a first polarization direction are ranked, and then non-zero LC coefficients for the layer in a second polarization direction are ranked. The non-zero LC coefficients in the first polarization direction are located before the non-zero LC coefficient in the second polarization direction after ranking. For the ranked non-zero LC coefficients in the first polarization direction and the ranked non-zero LC coefficients in the second polarization direction: indexes of frequency domain basis vectors corresponding to the non-zero LC coefficients are sequentially incremented, and indexes of spatial domain basis vectors corresponding to non-zero LC coefficients which correspond to frequency domain basis vectors with same indexes are sequentially incremented.

According to some embodiments, the first polarization direction is a strong polarization direction, and the second polarization direction is a weak polarization direction.

The process of ranking non-zero LC coefficients for a layer in the fourth implementation will be described below with reference to FIG. 9.

Figure 9:
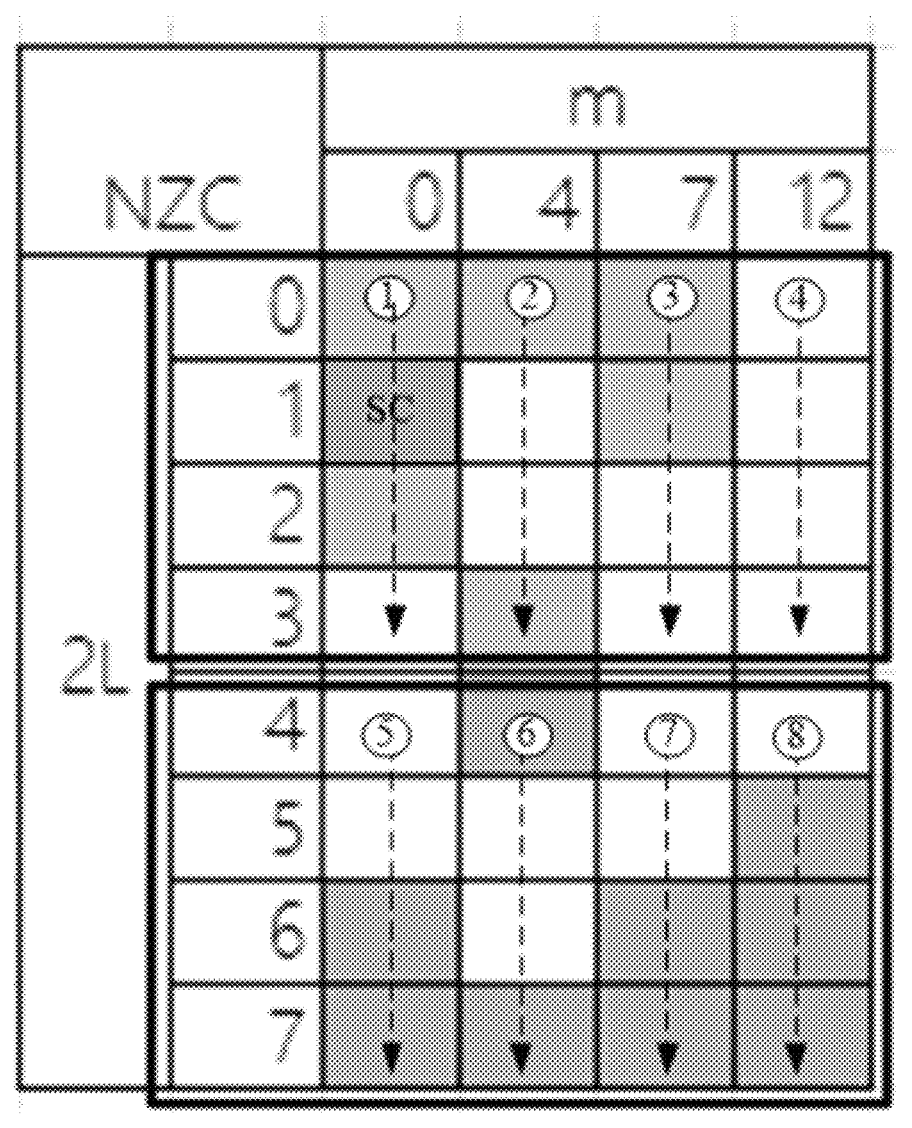

FIG. 9 is a schematic diagram showing another ranking of non-zero LC coefficients for a layer according to an embodiment of the present disclosure. Referring to FIG. 9, the non-zero LC coefficients in the first polarization direction are ranked first, and then the non-zero LC coefficients in the second polarization direction are ranked. When the non-zero LC coefficients in the first polarization direction are ranked, according to the order of m from small to high, ranking of the non-zero LC coefficients in the first polarization direction in respective columns is performed. When non-zero LC coefficients in each column are ranked, the non-zero LC coefficients in the column are ranked in an ascending order of indexes of SD basis vectors. For example, first, two non-zero LC coefficients in the column where m=0 are ranked, and the ranking order is as shown by the arrow; then, two non-zero LC coefficients in the column where m=4 are ranked and the ranking order is as shown by the arrow, and so on, until all non-zero LC coefficients in the first polarization direction are ranked. The process of ranking the non-zero LC coefficients in the second polarization direction is similar to the process of ranking the non-zero LC coefficients in the first polarization direction, and repeated descriptions will be omitted here.

Figure 10:
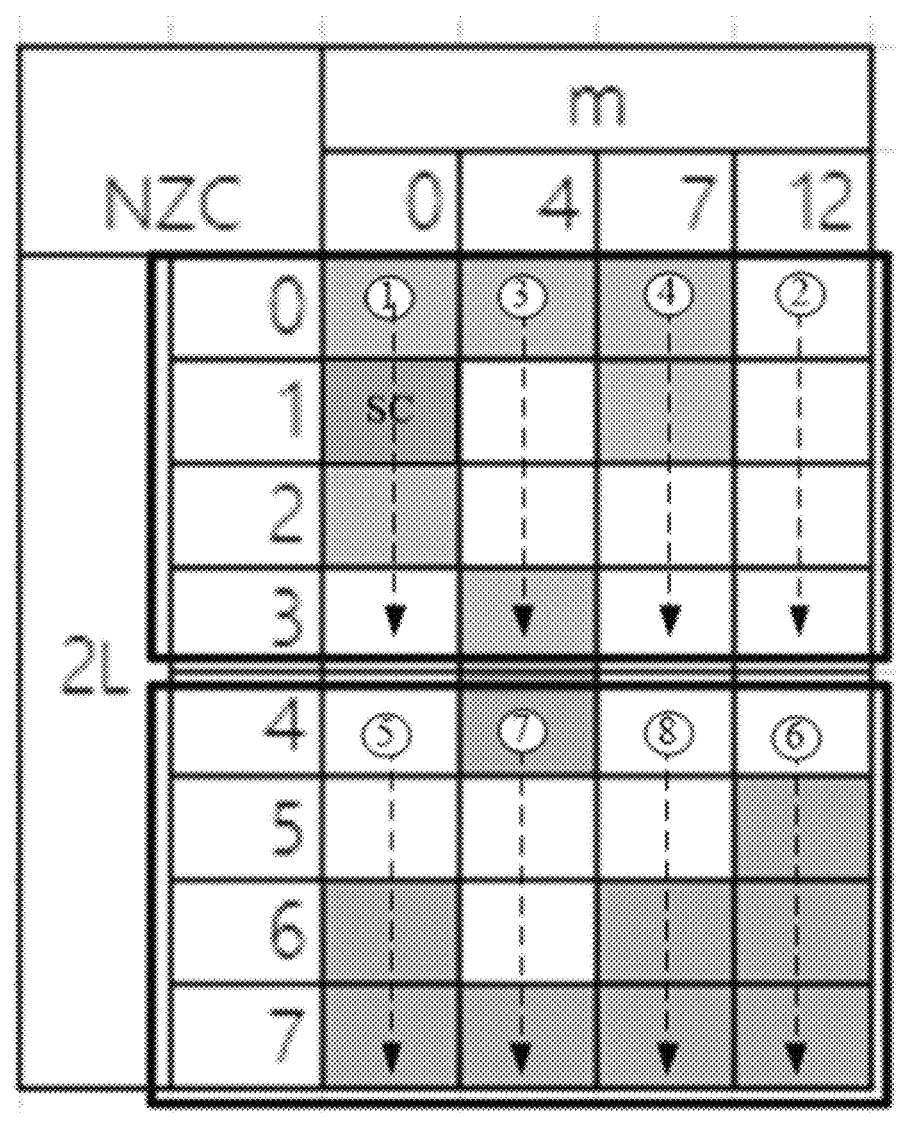

Referring to FIG. 9, it is assumed that the layer shown in FIG. 10 is the 0-th layer, the ranked non-zero LC coefficients are as follows: $c_{0,0,0}$, $c_{0,2,0}$, $c_{0,0,4}$, $c_{0,3,4}$, $c_{0,7,7}$, $c_{0,1,7}$, $c_{0,6,0}$, $c_{0,7,0}$, $c_{0,4,4}$, $c_{0,7,4}$, $c_{0,6,7}$, $c_{0,7,7}$, $c_{0,5,12}$, $c_{0,6,12}$, $c_{0,7,12}$.

It should be noted that, in the fourth implementation, the way of ranking between layers (alternating ranked non-zero LC coefficients for respectively layers) can refer to the ranking method shown in FIG. 7, and detailed descriptions will be omitted here.

In the fourth implementation, the process of ranking non-zero LC coefficients is simple and convenient, and among the ranked non-zero LC coefficients, non-zero LC coefficients in a strong polarization direction are given a higher ranking.

Fifth Implementation:

In the fifth implementation, the first information includes at least a non-zero LC coefficient and a polarization direction.

The non-zero LC coefficients for each layer are ranked first, and then the ranked non-zero LC coefficients for respective layers are alternately arranged.

According to some embodiments, the first information may further include an order between layers, and accordingly, the ranked non-zero LC coefficients for respective layers may be alternately arranged according to the order between layers.

When ranking the non-zero LC coefficients for each layer, first, non-zero LC coefficients for the layer in a first polarization direction are ranked, and then non-zero LC coefficients for the layer in a second polarization direction are ranked. The non-zero LC coefficients in the first polarization direction are located before the non-zero LC coefficient in the second polarization direction after ranking. For the ranked non-zero LC coefficients in the first polarization direction and the ranked non-zero LC coefficients in the second polarization direction: priorities of frequency-domain basis vectors corresponding to the non-zero LC coefficients are sequentially decreased, and indexes of spatial domain basis vectors corresponding to non-zero LC coefficients which correspond to frequency domain basis vectors with same priorities are sequentially incremented.

It should be noted that the method for determining the priorities of the frequency domain basis vectors in the fifth implementation manner is the same as the method for determining the priorities of the frequency domain basis vectors in the second implementation, and repeated descriptions will be omitted here.

The process of ranking non-zero LC coefficients for a layer in the fifth implementation will be described below with reference to FIG. 10.

FIG. 10 is a schematic diagram showing another ranking of non-zero LC coefficients for a layer according to an embodiment of the present disclosure. Refer to FIG. 10, it is assumed that indexes and priorities of the frequency domain basis vectors are shown in Table 3. According to the order of priority from high to low (the value of priority is from small to large), non-zero LC coefficients in the first polarization direction are ranked first, and then non-zero LC coefficients in the second polarization direction are ranked. When ranking the non-zero LC coefficients in the first polarization direction, first, two non-zero LC coefficients in the column where m=0 are ranked, and the ranking order is shown by the arrow; then, zero non-zero LC coefficient in the column where m=12 is ranked and the ranking order is shown by the arrow (this step may not be performed); then, two non-zero LC coefficients in the column where m=4 are ranked, and the ranking order is shown by the arrow; then, two non-zero LC coefficients in the column where m=7 are ranked, and the ranking order is shown by the arrow. The process of ranking the non-zero LC coefficients in the second polarization direction is similar to the process of ranking the non-zero LC coefficients in the first polarization direction, and repeated descriptions will be omitted here.

Referring to FIG. 10, it is assumed that the layer shown in FIG. 10 is the 0-th layer, the ranked non-zero LC coefficients are as follows: $c_{0,0,0}$, $c_{0,2,0}$, $c_{0,0,4}$, $c_{0,3,4}$, $c_{0,0,7}$, $c_{0,1,7}$, $c_{0,6,0}$, $c_{0,7,0}$, $c_{0,5,12}$, $c_{0,6,12}$, $c_{0,7,12}$, $c_{0,4,4}$, $c_{0,7,4}$, $c_{0,6,7}$, $c_{0,7,7}$.

It should be noted that, in the fifth implementation, the way of ranking between layers (alternating ranked non-zero LC coefficients for respectively layers) can refer to the ranking method shown in FIG. 7, and detailed descriptions will be omitted here.

In S502, the to-be-transmitted non-zero LC coefficients are determined according to the ranked at least one non-zero LC coefficient.

After the non-zero LC coefficients for all layers are ranked, a part of the non-zero LC coefficients in the ranked non-zero LC coefficients may be determined as the non-zero LC coefficients to be transmitted according to a preset rule.

According to some embodiments, the number of non-zero LC coefficients to be sent (a first preset number for short) can be preset, and the first preset number of non-zero LC coefficients in the ranked non-zero LC coefficients can be determined as the to-be-transmitted non-zero LC coefficients.

According to some embodiments, a ratio for sending non-zero LC coefficients (a first preset ratio for short) can be preset, and the first preset ratio of non-zero LC coefficients in the ranked non-zero LC coefficients can be determined as the to-be-transmitted non-zero LC coefficients. For example, assuming that the first preset ratio is 0.5, the first 50% of non-zero LC coefficients in the ranked non-zero LC coefficients may be determined as the to-be-transmitted non-zero LC coefficients.

According to some embodiments, the number of to-be-transmitted non-zero LC coefficients for each layer is greater than or equal to the number of non-zero LC coefficients corresponding to the FD basis vector with index 0 for the layer. That is, $K_{NZ,Rep}^{l} \geq K_{0,NZ}^{l}$, where $K_{NZ,Rep}^{l}$ is the number of to-be-transmitted non-zero LC coefficients for the l-th layer, and $K_{0,NZ}^{l}$ is the number of non-zero LC coefficients corresponding to the FD basis vector (FD-basis 0) (FD component 0) with index 0 for the l-th layer.

In the embodiment shown in FIG. 5, the non-zero LC coefficients for all layers are ranked first, and then a part of the ranked non-zero LC coefficients which have a relatively high ranking are selected as the to-be-transmitted non-zero LC coefficients. In other words, a part of non-zero LC coefficients which have a relatively low ranking in the ranked non-zero LC coefficients are omitted. Omitting a part of non-zero LC coefficients which have a relatively low ranking can not only reduce the transmission resources (PUSCH resources) required for CSI, but also make sure that the omitted part of the non-zero LC coefficients has less influence on the determination of the channel state information by the network device.

Figure 11:
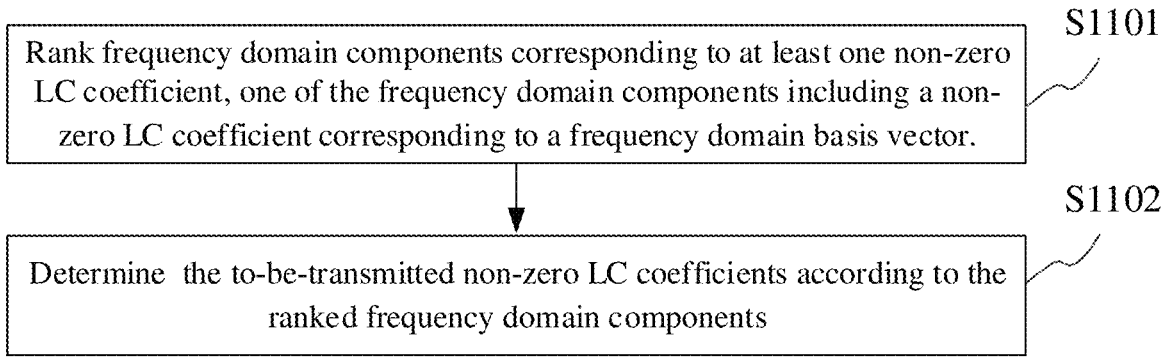
FIG. 11 is a schematic flowchart of another method for determining a to-be-transmitted non-zero LC coefficient according to an embodiment of the present disclosure.

Next, another method for determining the to-be-transmitted non-zero LC coefficients will be introduced with reference to FIG. 11. In FIG. 11, the contents in the first information may include the following case:

In Case 1, the first information includes a frequency domain component.

In Case 2, the first information includes a frequency domain component and an order between layers.

FIG. 11 is a schematic flowchart of another method for determining to-be-transmitted non-zero LC coefficients according to an embodiment of the present disclosure. Referring to FIG. 11, the method may include the following steps:

In S1101, frequency domain components corresponding to at least one non-zero LC coefficient are ranked. One of the frequency domain components includes a non-zero LC coefficient corresponding to a frequency domain basis vector.

According to some embodiments, frequency domain components for each layer may be ranked first, and then the ranked frequency domain components for all layers may be ranked according to the order of the frequency domain components for each layer.

According to some embodiments, the frequency domain components can be ranked through the following feasible implementations:

First Implementation:

In the first implementation, the first information includes at least a frequency domain component.

The frequency domain components for each layer are ranked first, and then the ranked frequency domain components for respective layers are alternately arranged.

According to some embodiments, the first information may further include an order between layers, and accordingly, the ranked frequency domain components for respective layers may be alternately arranged according to the order between layers.

When the frequency domain components for each layer are ranked, the frequency domain components can be ranked according to the indexes of the frequency domain components. After the frequency domain components for each layer are ranked, the indexes of the frequency domain basis vectors corresponding to the ranked frequency domain components are sequentially incremented.

For example, referring to FIG. 6, the column where m=0 is frequency domain component 1, and the frequency domain component 1 contains four non-zero LC coefficients (not including SC) in this column. The column where m=4 is frequency domain component 2, and the frequency domain component 2 contains four non-zero LC coefficients in the column. The column where m=7 is frequency domain component 3, and the frequency domain component 3 contains four non-zero LC coefficients in this column. The column where m=12 is frequency domain component 4, and the frequency domain component 4 contains three non-zero LC coefficients in this column. The ranked frequency domain components for this layer are: frequency domain component 1, frequency domain component 2, frequency domain component 3, and frequency domain component 4.

It should be noted that, in the first implementation, the way of ranking between layers (alternating ranked frequency domain components for respectively layers) can refer to the ranking method shown in FIG. 7, and detailed descriptions will be omitted here.

Second Implementation:

In the second implementation, the first information includes at least a frequency domain component.

The frequency domain components for each layer are ranked first, and then the ranked frequency domain components for respective layers are alternately arranged.

According to some embodiments, the first information may further include an order between layers, and accordingly, the ranked frequency domain components for respective layers may be alternately arranged according to the order between layers.

When the frequency domain components for each layer are ranked, the frequency domain components may be ranked according to cyclic distances between the frequency domain components and a first frequency domain component. After the frequency domain components for each layer are ranked, cyclic distances S between the frequency domain basis vectors corresponding to the ranked frequency domain components and the first frequency domain basis vector are sequentially in incremented.

According to some embodiments, the priorities of the frequency domain components may be determined according to the cyclic distances between the frequency domain components and the first frequency domain component, and the frequency domain components may be ranked according to the priorities of the frequency domain components, and the priorities of the ranked frequency domain components are decreased sequentially.

It should be noted that details regarding the cyclic distance and priority in this feasible implementation can refer to the previous description regarding the cyclic distance and priority shown in the embodiment of FIG. 5, and repeated descriptions will be omitted here.

For example, referring to FIG. 8, the column where m=0 is frequency domain component 1, and the frequency domain component 1 contains four non-zero LC coefficients (not including SC) in this column. The column where m=4 is frequency domain component 2, and the frequency domain component 2 contains four non-zero LC coefficients in the column. The column where m=7 is frequency domain component 3, and the frequency domain component 3 contains four non-zero LC coefficients in this column. The column where m=12 is frequency domain component 4, and the frequency domain component 4 contains three non-zero LC coefficients in this column. The ranked frequency domain components for this layer are: frequency domain component 1, frequency domain component 4, frequency domain component 2 and frequency domain component 3.

It should be noted that, in the second implementation, the way of ranking between layers (alternating ranked frequency domain components for respectively layers) can refer to the ranking method shown in FIG. 7, and detailed descriptions will be omitted here.

Third Implementation:

In the third implementation, the first information includes at least a frequency domain component.

Frequency domain components for each layer are ranked, and the ranked frequency domain components for each layer are grouped to obtain frequency domain component groups (FD component groups) for each layer, wherein one of the frequency domain component groups comprises at least two frequency domain components, and the at least one non-zero LC coefficient corresponds to a total of B frequency domain component groups, wherein B is an integer greater than 2, and the B frequency domain component groups are ranked.

According to some embodiments, at least two adjacent frequency domain components may be grouped into one group. M frequency domain components can be divided into X frequency domain component groups, then there are X−1 frequency domain component groups composed of [M/X] frequency domain components, and a frequency domain component group consists of M−[M/X]×(X−1) frequency domain components.

According to some embodiments, for a layer for RI=1 (one layer) and RI=2 (two layers), the frequency domain components for the layer can be divided into X frequency domain component groups; for a layer for RI=3 (three layers) and RI=4 (four layers), the frequency domain components for the layer can be divided into Y frequency domain component groups. According to some embodiments, X can be equal to Y.

It should be noted that, details regarding the manner of ranking the frequency domain components for each layer can be found in the first feasible implementation and the second feasible implementation manner, and repeated descriptions will be omitted here.

It should be noted that details regarding the method for ranking the B frequency domain component groups can be found in the ranking method shown in FIG. 7, and repeated descriptions will be omitted here.

In S1102, according to the ranked frequency domain components, the to-be-transmitted non-zero LC coefficients are determined.

After the frequency domain components for all layers are ranked, a part of the frequency domain components in the ranked frequency domain components can be selected according to a preset rule, and the non-zero LC coefficients in the selected part of the frequency domain components can be determined as the to-be-transmitted non-zero LC coefficients.

When the frequency domain components are ranked according to the first implementation or the second implementation in S1101, the to-be-transmitted non-zero LC coefficients can be determined in the following manners:

According to some embodiments, the number of frequency domain components (a second preset number for short) can be preset (or predefined), and non-zero LC coefficients in the first second preset number of frequency domain components in the ranked frequency domain components can be determined as the to-be-transmitted non-zero LC coefficients.

According to some embodiments, a preset ratio of frequency domain components (referred to as a second preset ratio) can be preset, and the non-zero LC coefficients in the first second preset ratio of frequency domain components among the ranked frequency domain components can be determined as the to-be-transmitted non-zero LC coefficients. For example, it is assumed that the second preset ratio is 0.5, the non-zero LC coefficients in the first 50% of the ranked frequency domain components may be determined as the to-be-transmitted non-zero LC coefficients.

According to some embodiments, in the second CSI, the number of frequency domain components for each layer may be the same. For example, the number of frequency domain components for each layer is A, where A is greater than or equal to 1.

According to some embodiments, in the second CSI, the number of frequency domain components in each layer may be different. For example, the number of frequency domain components for an i-th layer is $A_i$, where $A_i$ is greater than or equal to 1.

When ranking the frequency domain components according to the third feasible implementation in S1101, the to-be-transmitted non-zero LC coefficients can be determined in the following manner:

According to some embodiments, the number of frequency domain component groups (a third preset number for short) can be preset (or predefined), and non-zero LC coefficients in the first third preset number of frequency domain component groups among the ranked frequency domain component groups can be determined as the to-be-transmitted non-zero LC coefficients.

According to some embodiments, a preset ratio of frequency domain component groups (referred to as a third preset ratio) can be preset, and the non-zero LC coefficients in the first third preset ratio of frequency domain component groups among the ranked frequency domain component groups can be determined as the to-be-transmitted non-zero LC coefficients. For example, it is assumed that the second preset ratio is 0.5, the non-zero LC coefficients in the first 50% of the ranked frequency domain component groups may be determined as the to-be-transmitted non-zero LC coefficients.

According to some embodiments, in the second CSI, the number of frequency domain component groups for each layer may be the same. For example, the number of frequency domain component groups for each layer is A, where A is greater than or equal to 1.

According to some embodiments, in the second CSI, the number of frequency domain component groups in each layer may be different. For example, the number of frequency domain component groups for an i-th layer is $A_i$, where $A_i$ is greater than or equal to 1.

In the embodiment shown in FIG. 11, optionally, when N3>19, $N'^{rep}_3 = [\alpha N'_3]$, that is, a small window is used, where a can be fixed or a parameter configured by a higher layer, and the terminal device can drop non-zero LC coefficients in all frequency domain components outside the new window. According to some embodiments, the bit width for each layer is $$\left\lceil \log_2 \binom{N'^{,rep}_3 - 1}{M^{rep} - 1} \right\rceil.$$

According to some embodiments, at least one preset frequency domain component among multiple frequency domain components for each layer may be determined as the to-be-transmitted non-zero LC coefficients. The at least one preset frequency domain component is: at least one frequency domain component corresponding to the first N frequency domain basis vectors among frequency domain basis vectors which are ranked in an ascending order of the indexes of the frequency domain basis vectors, and N is an integer greater than or equal to 1. For example, when N is equal to 1, the non-zero LC coefficient in the first frequency domain component (FD-component 0, that is, corresponding to FD basis 0) may be determined as the to-be-transmitted non-zero LC coefficient. In this case, there is no need to rank the frequency domain component. In this case, the second CSI may not include the frequency domain basis indicator corresponding to a dropped frequency domain component. The bit width of the bitmap for each layer is 2L bits.

According to some embodiments, when the terminal device omits non-zero LC coefficients in some frequency domain components, the spatial domain basis indicator, SCI and the reference amplitude are not affected. For the frequency domain basis indicator, the bit width for each layer is $$\left\lceil \log_2 \binom{N_3 - 1}{M^{rep} - 1} \right\rceil \text{ or } \left\lceil \binom{N_3 - 1}{M' - 1} \right\rceil.$$

The bit width of the bitmap for each layer is $2LM^{rep}$ or $2LM'$.

In the embodiment shown in FIG. 11, the frequency domain components for all layers are ranked first, and then non-zero LC coefficients in a part of the ranked frequency domain components (or frequency domain component groups) which have a relatively high ranking are selected as the to-be-transmitted non-zero LC coefficients. In other words, a part of non-zero LC coefficients which have a relatively low ranking in the ranked non-zero LC coefficients are omitted. Omitting a part of non-zero LC coefficients which have a relatively low ranking can not only reduce the transmission resources (PUSCH resources) required for CSI, but also make sure that the omitted part of the non-zero LC coefficients has less influence on the determination of the channel state information by the network device.

According to some embodiments, the first information may include a polarization direction. In this case, the non-zero LC coefficients in a strong polarization direction can be determined as the to-be-transmitted non-zero LC coefficient. In this case, the second CSI includes the spatial domain basis indicator, frequency domain basis indicator and SCI for each layer, the bit width of each layer's bitmap is $LM_i$, and the second CSI does not include the reference amplitude for each layer.

According to some embodiments, the first information may include an order between layers. In this case, the non-zero LC coefficients for a preset layer can be determined as the to-be-transmitted non-zero LC coefficients.

According to some embodiments, when the terminal device determines that the PUSCH resources allocated by the network device are less than the PUSCH resources required to send the first CSI, the terminal device may fall back from the Rel. 16 Type II codebook to the Rel. 15 Type II codebook for reporting the CSI, and adopt the codebook omission rules in Rel. 15. Alternatively, the terminal device can fall back from the Rel. 16 Type II codebook to the Rel. 15 Type I codebook for reporting the CSI.

Figure 12:
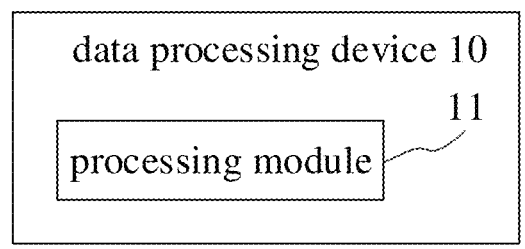
FIG. 12 is a schematic structural diagram of a data processing device according to an embodiment of the present disclosure.

FIG. 12 is a schematic structural diagram of a data processing device according to an embodiment of the present disclosure. Referring to FIG. 12, the data processing device 10 may include a processing module 11.

The processing module 11 is configured to obtain first Channel State Information (CSI); and the processing module 11 is further configured to determine second CSI in the first CSI according to first information, wherein the first information comprises at least one of: a non-zero Linear Combination (LC) coefficient, a frequency domain component, a polarization direction, or an order between layers.

The data processing device according to embodiments of the present disclosure can perform the technical solutions shown in the above method embodiments, and the working principles and beneficial effects are similar as that of the method embodiments, and repeated descriptions are omitted here.

In a possible implementation, the first CSI comprises at least one non-zero LC coefficient;

wherein the processing module 11 is configured to:
determine a to-be-transmitted non-zero LC coefficient among the at least one non-zero LC coefficient according to the first information; and
omit a non-zero LC coefficient other than the to-be-transmitted non-zero LC coefficient from the first CSI to obtain the second CSI.

In a possible implementation, the first information comprises the non-zero LC coefficient;
wherein the processing module 11 is configured to:
rank the at least one non-zero LC coefficient; and
determine the to-be-transmitted non-zero LC coefficient according to the ranked at least one non-zero LC coefficient.

In a possible implementation, the processing module 11 is configured to:
rank non-zero LC coefficients for each layer separately; and
rank the at least one non-zero LC coefficient according to a layer which each of the non-zero LC coefficients belongs to and the ranked non-zero LC coefficients for each layer.

In a possible implementation, for the ranked non-zero LC coefficients for each layer: indexes of frequency domain basis vectors corresponding to the non-zero LC coefficients are sequentially incremented, and indexes of spatial domain basis vectors corresponding to non-zero LC coefficients which correspond to frequency domain basis vectors with same indexes are sequentially incremented.

In a possible implementation, for the ranked non-zero LC coefficients sorted for each layer: cyclic distances S between frequency domain basis vectors corresponding to the non-zero LC coefficients and a first frequency domain basis vector are sequentially incremented, and indexes of spatial domain basis vectors corresponding to non-zero LC coefficients which correspond to frequency domain basis vectors with same indexes are sequentially incremented;
wherein the first frequency domain basis vector is a frequency domain basis vector with an index of 0; if $k_m \leq [N_3/2]$, then $S=k_m$; if $k_m > [N_3/2]$, then $S=N_3-k_m$, $k_m$ is an index of a frequency domain basis vector corresponding to a non-zero LC coefficient, $N_3$ is the number of the frequency domain basis vectors, and $[N_3/2]$ refers to rounding up $N_3/2$.

In a possible implementation, for the ranked non-zero LC coefficients sorted for each layer: priorities of the non-zero LC coefficients are sequentially incremented, and the priorities of the non-zero LC coefficients are determined according to indexes of frequency domain basis vectors corresponding to the non-zero LC coefficients.

In a possible implementation, the larger an index of a frequency domain basis vector corresponding to a non-zero LC coefficient, the lower a priority of the non-zero LC coefficient; or,
the larger an index of a frequency domain basis vector corresponding to a non-zero LC coefficient, the higher a priority of the non-zero LC coefficient.

In a possible implementation, for the ranked non-zero LC coefficients for each layer: non-zero LC coefficients in a first polarization direction are located before non-zero LC coefficients in a second polarization direction;
for the non-zero LC coefficients in the first polarization direction and the second polarization direction: indexes of frequency domain basis vectors corresponding to the non-zero LC coefficients are sequentially incremented, and indexes of spatial domain basis vectors corresponding to non-zero LC coefficients which correspond to frequency domain basis vectors with same indexes are sequentially incremented.

In a possible implementation, the first polarization direction is a strong polarization direction, and the second polarization direction is a weak polarization direction.

In a possible implementation, the processing module 11 is configured to:
alternately arrange the ranked non-zero LC coefficients for layers according to the order between layers.

In a possible implementation, in the second CSI, the number of non-zero LC coefficients for a i-th layer is greater than or equal to non-zero LC coefficients for the i-th layer which correspond to a first frequency domain basis vector, wherein the first frequency domain basis vector is a frequency domain basis vector with an index of 0.

In a possible implementation, the first information comprises the frequency domain component;
wherein the processing module 11 is configured to:
rank frequency domain components corresponding to the at least one non-zero LC coefficient, wherein one of the frequency domain components comprise a non-zero LC coefficient corresponding to a frequency domain basis vector; and
determine the to-be-transmitted non-zero LC coefficient according to the ranked frequency domain components.

In a possible implementation, the processing module 11 is configured to:
rank frequency domain components for each layer separately; and
rank the frequency domain components corresponding to the at least one non-zero LC coefficient according to the ranked frequency domain components for each layer.

In a possible implementation, the processing module 11 is configured to:
rank frequency domain components for each layer;
group the ranked frequency domain components for each layer to obtain frequency domain component groups for each layer, wherein one of the frequency domain component groups comprises at least two frequency domain components, and the at least one non-zero LC coefficient corresponds to a total of B frequency domain component groups, wherein B is an integer greater than 2; and
rank the B frequency domain component groups.

In a possible implementation, for the ranked frequency domain components for each layer: indexes of frequency domain basis vectors corresponding to the ranked frequency domain components are sequentially incremented.

In a possible implementation, for the ranked frequency domain components for each layer: cyclic distances S between frequency domain basis vectors which correspond to the ranked frequency domain components and a first frequency domain basis vector are sequentially incremented; wherein the first frequency domain basis vector is a frequency domain basis vector with an index of 0; if $k_m \leq [N_3/2]$, then $S=k_m$; if $k_m > [N_3/2]$, then $S=N_3-k_m$, $k_m$ is an index of a frequency domain basis vector corresponding to a non-zero LC coefficient, $N_3$ is the number of frequency domain basis vectors, and $[N_3/2]$ refers to rounding up $N_3/2$.

In a possible implementation, for the ranked frequency domain components for each layer: priorities of frequency domain basis vectors corresponding to the ranked frequency domain components are sequentially incremented, and the priorities of the frequency domain basis vectors are determined according to indexes of the frequency domain basis vectors corresponding to the frequency domain components.

In a possible implementation, the larger an index of a frequency domain basis vector corresponding to a frequency domain component, the lower a priority of the frequency domain basis vector; or,
the larger an index of a frequency domain basis vector corresponding to a frequency domain component, the higher a priority of the frequency domain basis vector.

In a possible implementation, in the second CSI, the number of frequency domain components for each layer is A, A is greater than or equal to 1, or the A is predefined.

In a possible implementation, in the second CSI, the number of frequency domain components for a i-th layer is $A_i$, $A_i$ is greater than or equal to 1, or $A_i$ is predefined.

In a possible implementation, in the second CSI, the number of frequency domain component groups for each layer is A, A is greater than or equal to 1, or A is predefined.

In a possible implementation, the first information comprises the frequency domain component;
wherein the processing module 11 is configured to:
determine at least one preset frequency domain component among multiple frequency domain components for each layer as the to-be-transmitted non-zero LC coefficient.

In a possible implementation, the at least one preset frequency domain component is frequency domain components corresponding to first N frequency domain basis vectors among frequency domain basis vectors which are ranked in an ascending order according to indexes of the frequency domain basis vectors, and N is an integer greater than or equal to 1.

In a possible implementation, the first information comprises the polarization direction;
wherein the processing module 11 is configured to:
determine a non-zero LC coefficient in a strong polarization direction as the to-be-transmitted non-zero LC coefficient.

In a possible implementation, the second CSI further comprises at least one of a spatial domain basis indicator, a frequency domain basis indicator, a strongest coefficient indicator, a reference amplitude, or a bitmap.

Figure 13:
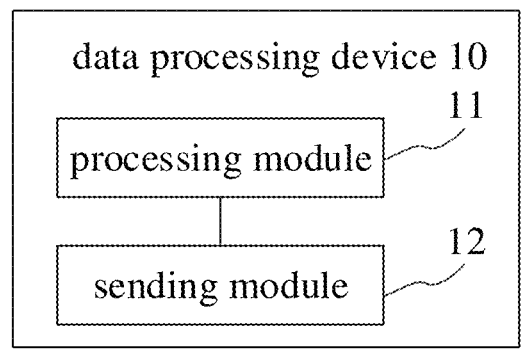
FIG. 13 is a schematic structural diagram of another data processing device according to an embodiment of the present disclosure.

FIG. 13 is a schematic structural diagram of another data processing device according to an embodiment of the present disclosure. On the basis of the embodiment shown in FIG. 12, the data processing device 10 further includes a sending module 12.

The sending module 12 is configured to, after the second CSI is determined by the processing module 11 in the first CSI according to the first information, send the second CSI to a network device; or,
the sending module 12 is configured to, after the second CSI is determined by the processing module 11 in the first CSI according to the first information, map the second CSI to Uplink Control Information (UCI), and send the UCI to the network device.

The data processing device according to embodiments of the present disclosure can perform the technical solutions shown in the above method embodiments, and the working principles and beneficial effects are similar as that of the method embodiments, and repeated descriptions are omitted here.

Figure 14:
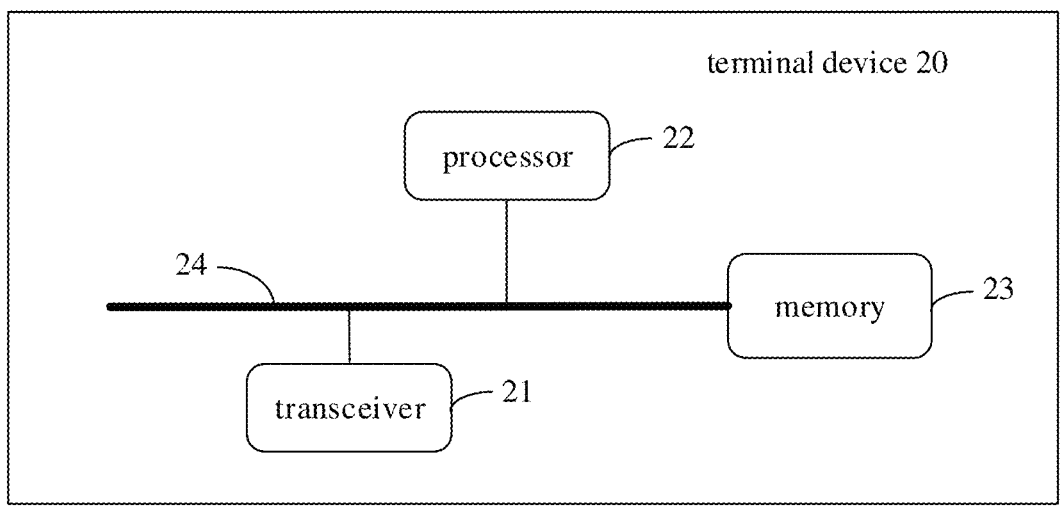
FIG. 14 is a schematic structural diagram of a terminal device according to an embodiment of the present disclosure.

FIG. 14 is a schematic structural diagram of a terminal device according to an embodiment of the present disclosure. Referring to FIG. 14, the terminal device 20 may include a transceiver 21, a memory 22, and a processor 23. The transceiver 21 may include a transmitter and/or a receiver. The transmitter can also be referred to as a sender, a transmitting device, a transmitting port, or a transmitting interface and so on, and the receiver can also be referred to as a receiving device, a receiving apparatus, a receiving port, or a receiving interface, or other similar descriptions. For example, the transceiver 21, the memory 22, and the processor 23 are connected to each other through a bus 24.

The memory 22 is configured to store program instructions.

The processor 23 is configured to execute the program instructions stored in the memory to cause the terminal device 20 to perform any of the data processing methods described above.

The receiver of the transceiver 21 can be configured to perform the receiving function of the terminal device in the above-mentioned data processing methods.

An embodiment of the present disclosure provides a computer-readable storage medium having computer-executable instructions stored thereon, and when the computer-executable instructions are executed by a processor, the processor is caused to perform the above-mentioned data processing methods.

An embodiment of the present disclosure provides a computer program product, which can be executed by a processor, and when the computer program product is executed, the processor is caused to perform the any one of the data processing methods which are performed by the terminal device.

The terminal device, computer-readable storage medium, and computer program product according to embodiments of the present disclosure can be configured to perform the data processing methods which are performed by the above described terminal device. Specific implementations and beneficial effects can be found in the above descriptions, and repeated descriptions will be omitted here.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed.

In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit. The integrated units may be implemented in a hardware form, or may be implemented in software functional units.

A person of ordinary skill in the art can understand that all or part of the steps in the foregoing method embodiments can be implemented by related hardware instructed by programs. The aforementioned computer programs can be stored in a computer readable storage medium. When the computer programs are executed by a processor, the processor is caused to perform the steps in the foregoing method embodiments. The storage medium includes: ROM, RAM, magnetic disk, or optical disk or other medium that can store program codes.

Finally, it should be noted that the above embodiments are only used to illustrate the technical solutions of the present disclosure, and should not be construed as constituting any limitations to the present disclosure. Although the present disclosure has been described in detail with reference to the foregoing embodiments, those of ordinary skill in the art should understand that the technical solutions described in the foregoing embodiments can be modified, or some or all of the technical features can be equivalently replaced; and these modifications or replacements do not make the essence of corresponding technical solutions deviate from the scope of the technical solutions according to embodiments of the present disclosure.

What is claimed is:

1. A data processing method for a Release 16 New Radio (NR) type II codebook, comprising:
   obtaining first channel state information (CSI), wherein the first CSI comprises at least one non-zero LC coefficient; and
   determining second CSI in the first CSI according to first information, wherein the first information comprises a non-zero Linear Combination (LC) coefficient and a frequency domain component; and
   sending the second CSI;
   wherein determining the second CSI in the first CSI according to the first information comprises:
   determining a to-be-transmitted non-zero LC coefficient among the at least one non-zero LC coefficient according to the first information; and
   omitting a non-zero LC coefficient other than the to-be-transmitted non-zero LC coefficient from the first CSI to obtain the second CSI;
   wherein determining the to-be-transmitted non-zero LC coefficient among the at least one non-zero LC coefficient according to the first information comprises:
   ranking the at least one non-zero LC coefficient according to a priority of a frequency domain basis vector corresponding to the at least one non-zero LC coefficient; and
   determining the to-be-transmitted non-zero LC coefficient according to the ranked at least one non-zero LC coefficient;
   wherein ranking the at least one non-zero LC coefficient comprises:
   ranking non-zero LC coefficients for each layer separately; and
   ranking the at least one non-zero LC coefficient according to a layer which each of the non-zero LC coefficients belongs to and the ranked non-zero LC coefficients for each layer;
   wherein for the ranked non-zero LC coefficients sorted for each layer: values of priorities of the non-zero LC coefficients are sequentially incremented, and correspondingly, priorities of frequency domain basis vectors corresponding to the non-zero LC coefficients are sequentially decreased.

2. The method according to claim 1, wherein the priorities of the non-zero LC coefficients are determined according to indexes of frequency domain basis vectors corresponding the non-zero LC coefficients.

3. The method according to claim 1, wherein the priorities of the non-zero LC coefficients are: $\min(2k_m, 2(N_3-k_m)-1)$, where $k_m$ is an index of a frequency domain basis vector corresponding to any one of the non-zero LC coefficients, and $N_3$ is the number of frequency domain basis vectors.

4. The method according to claim 1, wherein:
   the larger an index of a frequency domain basis vector corresponding to a non-zero LC coefficient, the lower a priority of the non-zero LC coefficient; or,
   the larger an index of a frequency domain basis vector corresponding to a non-zero LC coefficient, the higher a priority of the non-zero LC coefficient.

5. The method according to claim 1, wherein:
   for the ranked non-zero LC coefficients for each layer: non-zero LC coefficients in a first polarization direction are located before non-zero LC coefficients in a second polarization direction;
   for the non-zero LC coefficients in the first polarization direction and the second polarization direction: indexes of frequency domain basis vectors corresponding to the non-zero LC coefficients are sequentially incremented, and indexes of spatial domain basis vectors corresponding to non-zero LC coefficients which correspond to frequency domain basis vectors with same indexes are sequentially incremented.

6. A terminal device for a Release 16 New Radio (NR) type II codebook, comprising one or more processors, memory storing a plurality of programs that, when executed by the one or more processors, cause the terminal device to:
   obtain first channel state information (CSI), wherein the first CSI comprises at least one non-zero LC coefficient; and
   determine second CSI in the first CSI according to first information, wherein the first information comprises a non-zero Linear Combination (LC) coefficient and a frequency domain component; and
   send the second CSI;
   wherein when the plurality of programs are executed by the one or more processors, the terminal device is caused to:
   determine a to-be-transmitted non-zero LC coefficient among the at least one non-zero LC coefficient according to the first information; and
   omit a non-zero LC coefficient other than the to-be-transmitted non-zero LC coefficient from the first CSI to obtain the second CSI;

wherein when the plurality of programs are executed by the one or more processors, the terminal device is caused to:

rank the at least one non-zero LC coefficient according to a priority of a frequency domain basis vector corresponding to the at least one non-zero LC coefficient; and determine the to-be-transmitted non-zero LC coefficient according to the ranked at least one non-zero LC coefficient;

wherein when the plurality of programs are executed by the one or more processors, the terminal device is caused to:

rank non-zero LC coefficients for each layer separately; and rank the at least one non-zero LC coefficient according to a layer which each of the non-zero LC coefficients belongs to and the ranked non-zero LC coefficients for each layer;

wherein for the ranked non-zero LC coefficients sorted for each layer: values of priorities of the non-zero LC coefficients are sequentially incremented, and correspondingly, priorities of frequency domain basis vectors corresponding to the non-zero LC coefficients are sequentially decreased.

7. The terminal device according to claim 6, wherein the priorities of the non-zero LC coefficients are determined according to indexes of frequency domain basis vectors corresponding the non-zero LC coefficients.

8. The terminal device according to claim 6, wherein the priorities of the non-zero LC coefficients are: $\min(2k_m, 2(N_3-k_m)-1)$, where $k_m$ is an index of a frequency domain basis vector corresponding to any one of the non-zero LC coefficients, and $N_3$ is the number of frequency domain basis vectors.

9. The terminal device according to claim 6, wherein:

the larger an index of a frequency domain basis vector corresponding to a non-zero LC coefficient, the lower a priority of the non-zero LC coefficient; or, the larger an index of a frequency domain basis vector corresponding to a non-zero LC coefficient, the higher a priority of the non-zero LC coefficient.

10. The terminal device according to claim 6, wherein:

for the ranked non-zero LC coefficients for each layer: non-zero LC coefficients in a first polarization direction are located before non-zero LC coefficients in a second polarization direction;

for the non-zero LC coefficients in the first polarization direction and the second polarization direction: indexes of frequency domain basis vectors corresponding to the non-zero LC coefficients are sequentially incremented, and indexes of spatial domain basis vectors corresponding to non-zero LC coefficients which correspond to frequency domain basis vectors with same indexes are sequentially incremented.

\* \* \* \* \*